United States Patent
Jung et al.

(10) Patent No.: US 10,122,923 B2
(45) Date of Patent: Nov. 6, 2018

(54) OIS CAMERA MODULE

(71) Applicant: MDPULSE CO., LTD., Gumi-si (KR)

(72) Inventors: Tae Hoon Jung, Suwon-si (KR); Jin Suk Han, Incheon (KR)

(73) Assignee: MDPULSE CO., LTD. (KR)

( * ) Notice: Subject to any disclaimer, the term of this patent is extended or adjusted under 35 U.S.C. 154(b) by 0 days.

(21) Appl. No.: 15/352,948

(22) Filed: Nov. 16, 2016

(65) Prior Publication Data

US 2018/0115715 A1    Apr. 26, 2018

(30) Foreign Application Priority Data

Oct. 20, 2016    (KR) ........................ 10-2016-0136263

(51) Int. Cl.
| | |
|---|---|
| G03B 13/36 | (2006.01) |
| G03B 17/00 | (2006.01) |
| H04N 5/232 | (2006.01) |
| G02B 7/09 | (2006.01) |
| G02B 27/64 | (2006.01) |
| G02B 7/08 | (2006.01) |
| H04N 5/225 | (2006.01) |

(52) U.S. Cl.
CPC .......... *H04N 5/23287* (2013.01); *G02B 7/08* (2013.01); *G02B 7/09* (2013.01); *G02B 27/646* (2013.01); *G03B 13/36* (2013.01); *H04N 5/2254* (2013.01); *H04N 5/23212* (2013.01); *G03B 2205/0015* (2013.01)

(58) Field of Classification Search
None
See application file for complete search history.

(56) References Cited

U.S. PATENT DOCUMENTS

| | | | | |
|---|---|---|---|---|
| 2002/0112543 | A1* | 8/2002 | Noguchi | .................. G03B 5/00 73/618 |
| 2010/0033820 | A1* | 2/2010 | Omi | ...................... G02B 27/646 359/554 |
| 2011/0176012 | A1* | 7/2011 | Yagisawa | ............. G02B 27/646 348/208.2 |
| 2011/0181740 | A1* | 7/2011 | Watanabe | ................ G03B 3/10 348/208.2 |
| 2013/0170039 | A1* | 7/2013 | Miyoshi | ............... G02B 27/646 359/554 |
| 2014/0078328 | A1* | 3/2014 | Park | ..................... G02B 27/646 348/208.11 |
| 2014/0119717 | A1* | 5/2014 | Yasuda | ................ G02B 27/646 396/55 |
| 2014/0177056 | A1* | 6/2014 | Hayashi | ................... G02B 7/08 359/557 |
| 2015/0253583 | A1* | 9/2015 | Cho | .................... G02B 13/0015 348/360 |

(Continued)

FOREIGN PATENT DOCUMENTS

KR    10-2007-0065195 A    6/2007

*Primary Examiner* — W B Perkey
(74) *Attorney, Agent, or Firm* — Kunzler, PC

(57) ABSTRACT

In an aspect, the OIS camera module includes a first unit mounted with a lens, a second unit movably mounted with the first unit along a horizontal direction perpendicular to an optical axis of the lens, and an OIS actuator moving the first unit along the horizontal direction relative to the second unit, wherein the OIS actuator may be lopsidedly arranged at one side about a center of the lens to the horizontal direction.

18 Claims, 10 Drawing Sheets

(56) References Cited

U.S. PATENT DOCUMENTS

| | | | |
|---|---|---|---|
| 2016/0018624 A1* | 1/2016 | Yeo | G03B 5/00 |
| | | | 359/557 |
| 2016/0124242 A1* | 5/2016 | Minamisawa | G03B 5/00 |
| | | | 359/557 |
| 2017/0052387 A1* | 2/2017 | Yu | G02B 7/04 |
| 2017/0082827 A1* | 3/2017 | Park | G02B 7/08 |
| 2017/0082873 A1* | 3/2017 | Zia | G02F 1/0115 |

* cited by examiner

OIS CAMERA MODULE

CROSS-REFERENCE TO RELATED APPLICATION(S)

This application claims the benefit under 35 USC § 119(a) of Korean Patent Application No. 10-2016-0136263 filed on Oct. 20, 2016 in the Korean Intellectual Property Office, the entire disclosures of which are incorporated herein by reference for all purposes.

FIELD

The present invention relates to a camera module photographing a subject, and more particularly, to an OIS (Optical Image Stabilizer) camera module having optical handshake correction means.

BACKGROUND

A general digital camera, where a camera module having an AF (Auto Focusing) function automatically adjusts a focus of a lens during photographing of a subject, is largely applied to mobile devices such as mobile phones or tablet PCs (Personal Computers).

Recently, digital cameras mounted with handshake correction means, not limited to the AF function alone, have continuously appeared. The handshake correction means may be largely divided to an EIS (Electronic Image Stabilizer) type and an OIS (Optical Image Stabilizer) type. The EIS type is a method that image-processes an image outputted from an image sensor. The OIS type is a method that mechanically adjusts a position or an angle of an image sensor or a lens optical system.

A camera module mounted with an OIS device is complicated in structure and voluminous, and therefore requires overcoming lots of technical obstacles in order to be adopted for use in a mobile device.

The Korean laid-open patent NO.: 2007-0065195 discloses a device for correcting a biased image, but this patent is structurally difficult to be miniaturized for use as mobile devices such as mobile phones.

CITED REFERENCE DOCUMENT

[Patent Document] [Korea laid-open Patent] 2007-0065195

Technical Subjects

The present invention is directed to provide an OIS (Optical Image Stabilizer) camera module optimized for a mobile device miniaturized in thickness and volume while embodying an OIS function.

Technical subjects to be solved by the present disclosure are not restricted to the above-mentioned description, and any other technical problems not mentioned so far will be clearly appreciated from the following description by the skilled in the art.

SUMMARY

In one general aspect of the present invention, there is provided an OIS camera module, the OIS camera module including a first unit mounted with a lens, a second unit movably mounted with the first unit along a horizontal direction perpendicular to an optical axis of the lens, and an OIS actuator moving the first unit along the horizontal direction relative to the second unit, wherein the OIS actuator is lopsidedly arranged at one side about a center of the lens to the horizontal direction.

The OIS camera module has an advantageous effect in that an OIS actuator is arranged at one side of a plane to allow an easy installation at the other side of various members such as an AF actuator and the like. Furthermore, due to no OIS actuator at the AF actuator side, no magnetic field interference between the AF actuator and the OIS actuator is generated to be advantageous to AF characteristics and OIS characteristics.

Another advantageous effect is that the OIS actuator arranged at one side of a lens may be mounted at a vicinity of a first unit or the second unit to allow arranging within an AF driving scope on an optical axis direction. Thus, increase in an overall thickness, which is greatly problematic in the OIS camera module, can be prevented in comparison with a comparative exemplary embodiment where the OIS actuator is mounted at a bottom side of the lens.

Still another advantageous effect is that, despite the increase in the number of magnets used for maximization of horizontal direction driving force, the number of OIS coils is maintained as one, such that resistance flowing with an electric signal is not additionally increased. Thus, there is no need to reduce the power consumption, whereby temperature change rate of OIS coils affecting the electromagnetic force can be reduced. Furthermore, it is possible to implement a low electric power driving because the electromagnetic force can be enhanced by the increase in the number of magnets.

Still another advantageous effect is that an OIS magnet is interposed between an OIS Hall sensor and an OIS coil to allow the OIS Hall sensor to be arranged at a position not affected by the OIS coil. Thus, an electromagnetic noise of the OIS coil applied to the OIS Hall sensor can be shielded.

Two magnets each facing the other across an OIS coil may be mutually arranged in parallel with an N pole facing an S pole. A magnetization direction of magnet is vertically formed with an OIS coil being positioned therebetween to minimize leakage of magnetism to outside and to doubly increase a driving force to a horizontal direction.

A normal force control setting an optimal frictional force is made possible free from changes in moving force through replacement of magnet/replacement of suction yoke.

An environment can be provided in which a first unit can move along a horizontal direction while a suction magnet and a first unit including a suction yoke are prevented from being deviated from a second unit.

A ball, one side and the other side thereof respectively contacting a first unit and a second unit, may be interposed between a first unit and a second unit by suction, lest movement of the first unit to a horizontal direction be limited by the suction.

In order to provide directivity to a first unit supported by a ball having various types of mobility, the first unit or the second unit may be formed with an OIS rail moving the ball to a set direction.

The horizontal direction driving force generated by an OIS actuator may be to move the first unit to a set direction. Realistically, the horizontal direction driving force generated by an OIS actuator may include a vector component facing to a direction different from a set direction. According to the OIS rail extended along the set direction, movement of the OIS ball may be changed to a set direction by a frictional difference between a rolling friction facing the set direction and a sliding friction applied to a direction perpendicular to the set direction. In other words, the movement of the ball is realized only along the set direction by the OIS rail extended to the set direction, such that the horizontal direction driving force generated by the OIS actuator resultantly follows the set direction accurately.

According to the OIS camera module, thickness of the first unit may be mutually different at a center area and at an edge area. The area where reliability is required may be increased in thickness, and the edge area where other members are required to be mounted may be decreased in thickness to allow obtaining a space where other members can be easily mounted.

For example, a magnet of OIS actuator arranged to face an edge of the first unit and a size of AF magnet at the AF actuator may be increased, or a gap between AF balls arranged in the plural number along the optical axis may be increased to thereby improve a tilt due to a decreased effect in rotational moment.

The OIS ball can reduce an OIS driving electric power by minimizing a friction during movement of the first unit, and OIS control accuracy can be greatly enhanced because the first unit freely and movably supports the optical axis only to a horizontal direction while maintaining a predetermined height relative to the optical axis.

The OIS ball can reduce the driving electric power by ideally reducing the frictional load during OIS driving to almost zero (0), compared with a case where the first unit is elastically supported by an elastic body, and a skew can be prevented where the first unit or a lens is slanted relative to the optical axis because a position error can be reduced.

DETAILED DESCRIPTION

Figure 1:
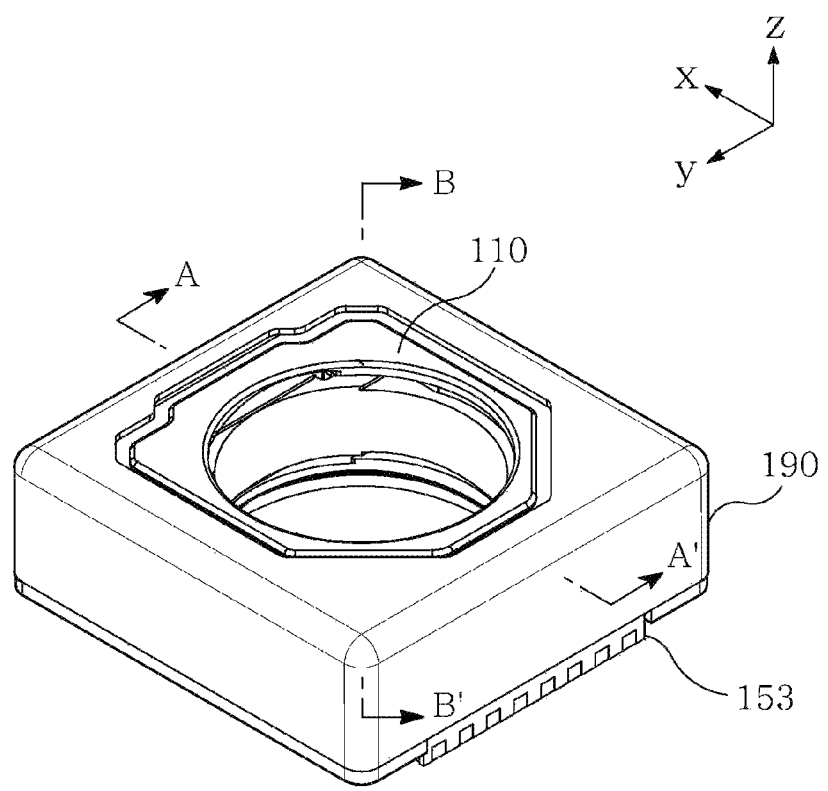
FIG. 1 is a perspective view illustrating an OIS camera module according to the present invention.

An OIS camera module illustrated in FIG. 1 may include a cover (190), a first unit (110, 140), a second unit (130) and an OIS actuator (131, 132, 135).

The 'horizontal direction' in the present invention may be defined by an x axis direction perpendicular to an optical axis (z axis), y axis direction and a diagonal direction of x axis and y axis. If the definition of the horizontal direction is expanded, a direction slanted to the optical axis while facing a lateral radius of the optical axis, albeit not being perpendicular to the optical axis, may be also defined approximately as the 'horizontal direction'.

The cover (190) or the second unit (130) may face an image sensor, form an external shape of the OIS camera module, provide an assembly base when the OIS camera module is assembled to an outside device such as a mobile device, and may support a load or an external force. The second unit (130) may be completely covered by the cover (190), or may be covered by the cover (190) while a remaining area may form an exterior look of the OIS camera module.

The first unit (110, 140) may be defined as an element that is moved relative to the fixed element of cover (190) or the second unit (130).

The first unit (110, 140) may be mounted with a lens. When more than one lens is mounted on a bobbin unit (120), the first unit (110, 140) may be mounted with the bobbin unit (120).

When one side of the optical axis incident with a light is defined as a first side, and the other side of the optical axis from which the light is discharged to an image sensor (not shown) side is defined as a second side, the first unit (110, 140) may be what is mutually combined by an upper unit (110) provided at the first side and a bottom unit (140) provided at the second side.

The bobbin unit (120) may be formed with a lens hole (129) mounted with a lens, and the first unit (110, 140) may be formed with a through hole (119) facing the lens hole (129).

The first unit (110, 140) may be movably mounted with the lens-mounted bobbin unit (120) to a horizontal direction. The first unit (110, 140) may move to the horizontal direction perpendicular to the optical axis relative to the second unit during the OIS driving.

The bobbin unit (120) or the lens may move along an optical direction of the lens relative to the first unit (110, 140) during AF driving, and the first unit (110, 140) may move along a horizontal direction relative to the second unit (130) during the driving. Thus, the lens can move to an optical axis direction based on the second unit (130) and to a horizontal direction as well. A driving force to an optical axis direction of the lens may be provided from the AF actuator (123, 125), and a driving force to a horizontal direction of the lens may be provided from the OIS actuator.

During the AF operation, the lens may move to an optical axis direction relative to the first unit (110, 140) and the second unit (130). The driving force to an optical axis direction of the lens may be generated by the AF actuator, where the AF actuator may be independent from whether the OIS actuator is operated or not.

The second unit (130) may be movably mounted with the first unit (110, 140) to allow the first unit to move along a horizontal direction perpendicular to the optical axis of the lens. The OIS actuator may generate a horizontal direction driving force to move the first unit (110, 140) relative to the second unit (130).

The OIS actuator may be lopsidedly mounted to one side based on a center of the lens onto a horizontal direction to allow miniaturization of OIS camera module and accurate AF driving and OIS driving.

In order to obtain a clear image, the OIS camera module may include an AF actuator moving the lens along an optical axis of the lens relative to the first unit (110, 140).

The AF actuator and the OIS actuator may include a magnet and a coil moved by magnetic force, where relevant magnetic forces may be mutually interfered.

The AF actuator may be lopsidedly arranged at the other side of the lens opposite to an arranged position of the OIS actuator based on the center of lens onto the horizontal direction. The possibility of the magnetic forces being mutually interfered can be minimized because the AF actuator and the OIS actuator are disposed at mutually opposite positions.

The OIS camera module according to the present invention may be provided with an OIS ball (20) interposed between the first unit (110, 140) and the second unit (130) to allow the first unit (110, 140) to move to horizontal direction. To be more specific, the OIS ball (20) may be interposed between an upper unit (110) provided at a first side and the second unit (130). The OIS operation may be stably realized because of the OIS ball (20) being arranged at the first side.

The OIS ball (20) may restrict the optical axis direction movement of the first unit (110, 140) to allow a horizontal direction movement when the first unit (110, 140) is moved by the OIS actuator along the horizontal direction relative to the second unit (130).

The phenomenon of the first unit (110, 140) being deviated from the second unit (130) along the optical axis direction may be prevented by the cover (190) that covers the first unit (110, 140) and the second unit (130). However, when the first unit maintains a state of the first unit (110, 140) being in contact with the (190), a horizontal direction driving force may be increased by the frictional force to thereby deteriorate a control accuracy.

The OIS camera module may include a suction unit to allow the first unit (110, 140) to be distanced from the cover (190), and to be tightly abutted to the second unit (130) through the OIS ball (20).

The suction unit may allow the first unit (110, 140) to be tightly adhered to the second unit (130) or to pull the first unit (110, 140) along the optical axis, whereby the first unit (110, 140) and the second unit (130) can be brought into contact with the OIS ball (20).

The suction unit may be provided with a suction magnet (133) mounted on any one unit of the first unit (110, 140) and the second unit (130), and a suction yoke (116) mounted on the other unit of the first unit (110, 140) and the second unit (130) to be sucked to the suction magnet (133) by the magnetic force of the suction magnet (133). The suction yoke (116) may be extended longer than the suction magnet (133) on the horizontal direction in order to generate a predetermined suction force regardless of the horizontal direction movement of the first unit (110, 140).

For example, the suction yoke (116) may be arranged at one surface of the upper unit (110) opposite to the second unit (130). The said one surface of the upper unit (110) may be provided with a lug-shaped or hole-shaped first mounting unit (114) mounted with the suction yoke (116), and the suction yoke (116) may be formed with a hole-shaped or lug-shaped second mounting unit (115) press-fitted to the first mounting unit (114). The suction yoke (116) having various magnetic forces or various shapes can be easily replaced by the first mounting unit (114) and the second mounting unit (115).

The suction magnet (133) may be arranged at one surface of the second unit (130) opposite to the upper unit (110). One surface of the second unit (130) may be provided with a groove-shaped insertion unit (134) accommodated by the suction magnet (133). The suction magnet (133) having various magnetic forces may be replaceably mounted on the second unit (130) through the insertion unit (134).

Meantime, a total thickness of the OIS camera module can be increased when at least two of the OIS actuator, the AF actuator, the OIS ball (20) and the suction unit are formed at the same position on a plane. In order to miniaturize the thickness, the OIS actuator, the AF actuator, the OIS ball (20) and the suction unit may be arranged mutually at a different position on a plane.

For example, the first unit (110, 140) and the second unit (130) may take a rectangular shape formed clockwise to the horizontal direction on a plan view in the order of a first vertex, a second vertex, a third vertex and a fourth vertex.

Figure 8:
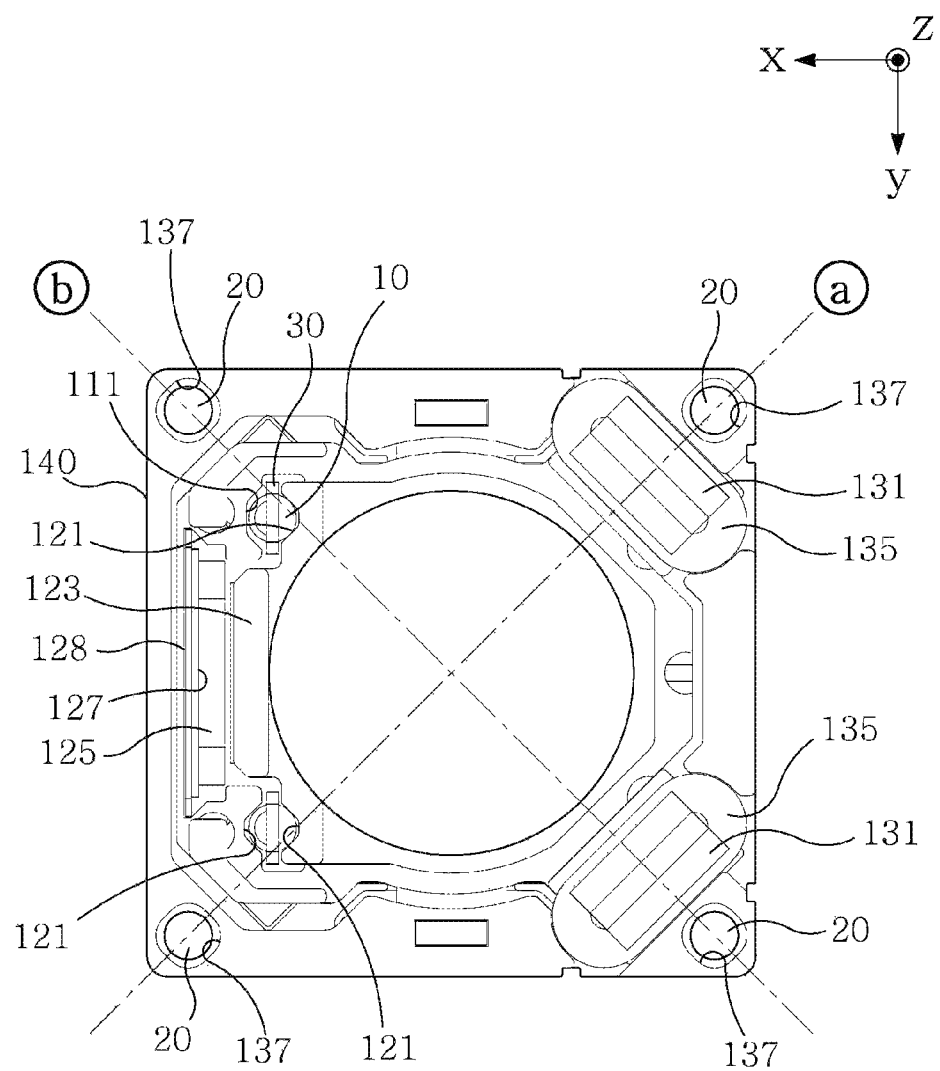
FIG. 8 is a plan view of a second unit.

Referring to FIG. 8 illustrated with the second unit (130), the first vertex may be a right upper vertex, the first side may be a right side, the second vertex may be a right bottom vertex, the second side may be a bottom side, the third vertex may be a left bottom vertex, the third side may be a left side, the fourth vertex may be a left upper vertex and the fourth side may be an upper side.

The OIS actuator may be arranged near to a vicinity of at least one of the first vertex, the first side and the second vertex based on the center 0 of the lens.

When two OIS actuators are provided for OIS correction, any one of the two OIS actuators may be arranged near to a vicinity of the first vertex, and the remaining one may be arranged near to a second vertex. The vicinity of the first vertex and the vicinity of the second vertex may become a clearance in a structure arranged with a circular lens, such that the OIS actuator can be mounted without increase in size of the first unit (110, 140) or the second unit (130).

Because the OIS actuator is lopsidedly arranged at one side based on the center O of the lens, the remaining second side, the third vertex, the third side, the fourth vertex and the fourth side may be formed with a clearance that can be installed with other members.

At this time, the AF actuator may be arranged at a side of the third side. When two OIS actuators are arranged at the first vertex and the second vertex, the mutual interference of magnetic forces can be minimized because of being symmetrically formed with the AF actuator arranged at a side of the third side.

When the OIS actuator is arranged only at one side, the number of installation of the OIS actuators may be reduced, compared with the comparative exemplary embodiment where four OIS actuators are arranged at a bottom side of the lens. Thus, there is a possibility that the horizontal direction driving force of the first unit (110, 140) cannot be sufficiently generated. The OIS actuator may take a special structure in order for the horizontal direction driving force to be sufficiently generated.

Figure 5:
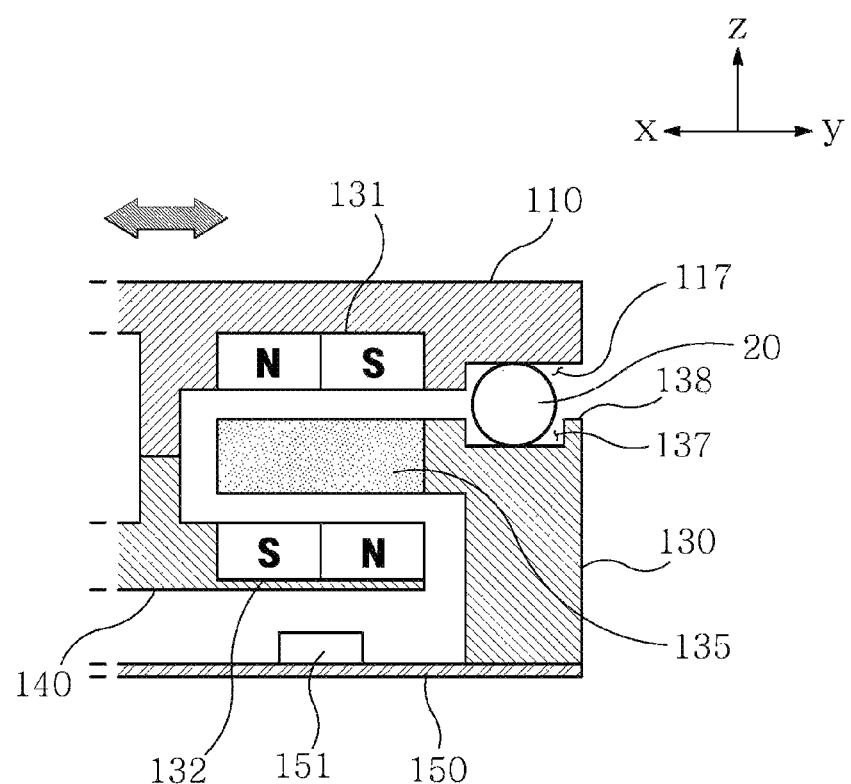
FIG. 5 is a schematic view illustrating an OIS actuator according to the present invention.
Figure 6:
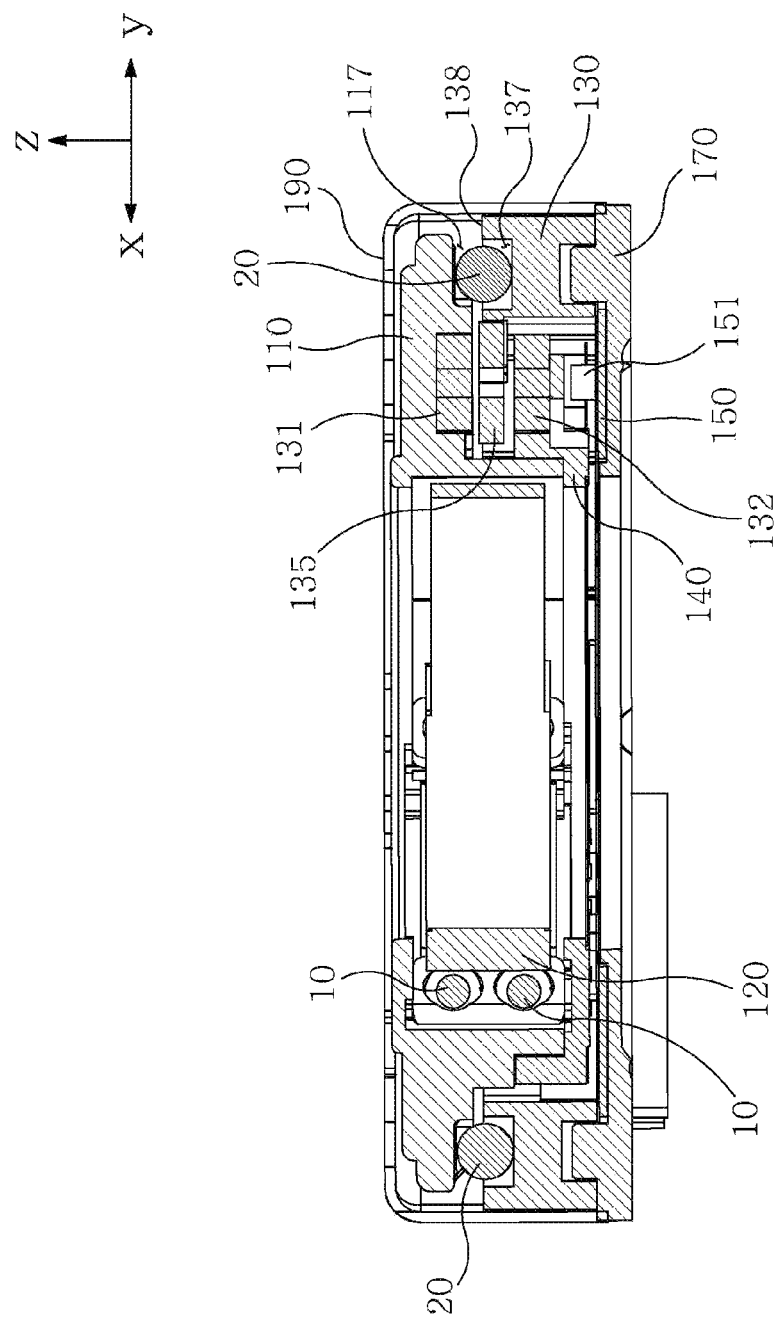
FIG. 6 is a schematic cross-sectional view taken along line B-B' of FIG. 1.

FIG. 5 is a schematic view illustrating an OIS actuator according to the present invention, and FIG. 6 is a schematic cross-sectional view taken along line B-B' of FIG. 1.

The OIS actuator may include a first OIS member and a second OIS member, each moving relative to the other by the magnetic force.

The first OIS member may be arranged in plural number at a position each spaced apart from the other along the optical axis, and the plurality of first OIS members may be fixed to any one of the first unit (110, 140) and the second unit (130).

The second OIS member may be interposed between the plurality of first OIS members, and may be fixed to any remaining unit of the first unit (110, 140) and the second unit (130).

Any one of the first OIS member and the second OIS member may include a magnet, and other remaining member of the first OIS member and the second OIS member may include a coil.

For example, the OIS actuator may be provided with a first magnet (131) and a second magnet (132) each fixed to the first unit (110, 140) and arranged at a different position along the optical axis. The first magnet (131) and the second magnet (132) may correspond to the first OIS member.

The OIS actuator may be provided with an OIS coil (135) fixed to the second unit (130) and interposed between the first magnet (131) and the second magnet (132). The OIS coil (135) may correspond to the second OIS member.

Even if the first magnet (131) and the second magnet (132) are mounted on the second unit (130), and the OIS coil (135) is mounted on the first unit (110, 140), there will be posed no particular problems to the OIS function. However, a structure of applying an OIS control signal to the OIS coil (135) may become complicated, compared with the exemplary embodiment mounted with the OIS coil (135) on the second unit (130).

A horizontal direction driving force may be increased by the increase in the magnetic force of the magnet, because one single OIS coil (135) is arranged at an upper side and a bottom side thereof with the first magnet (131) and the second magnet (132). Particularly, when the first magnet (131) and the second magnet (132) are arranged in such a fashion that an N pole of the first magnet (131) faces an S pole of the second magnet, and an S pole of the first magnet (131) faces an N pole of the second magnet (132), the magnetic force generated from the magnets may be increased twice, and the horizontal direction driving force may be maximized.

The first magnet (131) may be mounted on a groove-shaped first accommodation unit (113) formed at the upper unit (110), and the second magnet (132) may be mounted on a second accommodation unit (not shown) formed at the bottom unit (140).

The second unit (130) may be provided with an OIS Hall sensor (151) arranged opposite to the second magnet (132). The OIS Hall sensor (151) may detect the changes in magnetic force of the second magnet (132) moving along with the first unit (110, 140) during the OIS driving. The changes in magnetic force of the second magnet (132) detected by the OIS Hall sensor (151) mounted on the second unit (130) may be proportional to a horizontal direction displacement of the first unit (110, 140), such that a signal measured by the OIS Hall sensor (151) may be inputted as a feedback signal of the OIS coil (135).

The magnetic force of the OIS coil (135) transmitted to the OIS Hall sensor (151) may be shielded by the second magnet (132) interposed between the OIS Hall sensor (151) and the OIS coil (135). Furthermore, the OIS Hall sensor (151) can accurately grasp the displacement of the oppositely facing second magnet (132).

A first OIS actuator providing a horizontal direction driving force along a first axis perpendicular to the optical axis, and a second OIS actuator providing a horizontal direction driving force along a second axis perpendicular to optical axis may be provided. At this time, the first axis and the second axis may be respectively x axis, y axis, or ⓐ axis or ⓑ axis.

The OIS Hall sensor (151) may include a first OIS Hall sensor (151) feed-backing to the OIS coil (135) of the first OIS actuator by detecting movement of the second magnet (132) provided at the first OIS actuator in order to independently detect movement relative to the first axis and the second axis perpendicular to the optical axis, and a second OIS Hall sensor (151) feed-backing to the OIS coil (135) of the second OIS actuator by detecting movement of the second magnet (132) provided at the second OIS actuator.

The OIS Hall sensor (151) may be directly mounted on the second unit (130), or may be mounted on a separate OIS monitoring substrate, or may be mounted at the second unit (130) along with an OIS monitoring substrate. The OIS monitoring substrate (150) may be provided with a pattern connecting the OIS actuator and a first terminal unit (153), and a pattern connecting the AF actuator and a second terminal unit (154).

The second unit (130) may be coupled with a filter mounting unit (170) mounted with an UV filter across the OIS monitoring substrate (150). The filter mounting unit (170) may directly face the image sensor.

The OIS monitoring substrate (150) may be provided with a first terminal unit (153) electrically connected to a terminal mounted with an image sensor to exchange an OIS control signal. The OIS monitoring substrate (150) may be additionally provided with a second terminal unit (154) to exchange an AF control signal with the terminal.

The first terminal unit (153) may be also arranged at one side of the second unit (130) because the OIS actuator is arranged at one side of the second unit (130) according to the present invention. Furthermore, because the AF actuator is arranged at the other side of the second unit (130), the second terminal unit (154) may be also arranged at the other side of the second unit (130). Each terminal unit can be easily connected to the terminal because the first terminal unit (153) and the second terminal unit (154) are arranged at mutually different sides.

Any one of the first unit (110, 140) and the second unit (130) may be provided with a pocket unit (137) supported by one side of the OIS ball (20). The other remaining unit of the first unit (110, 140) and the second unit (130) may be provided with an OIS rail (117) supported by the other side of the OIS ball (20).

The pocket unit (137) may include a groove blocked in four sides by walls (138) to a horizontal direction in order to prevent the OIS ball (20) from being deviated. When there is no problem of the OIS ball (20) being deviated, there is no problem if the pocket unit (137) is formed with surrounding four sides being opened.

The OIS rail (117) may be extended along a set direction. The set direction at this time may match to the □ axis or to the ⓑ axis.

Figure 10:
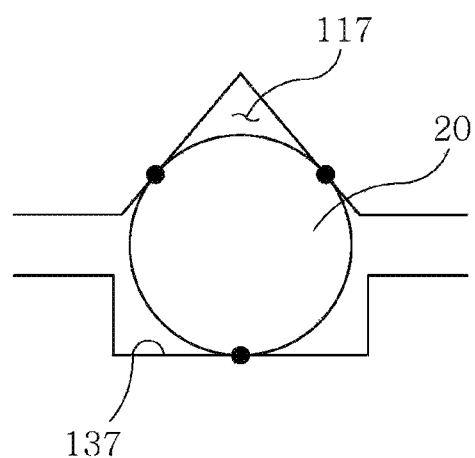
FIG. 10 is a schematic view illustrating a cross-section of a pocket unit and an OIS rail.

FIG. 10 is a schematic view illustrating a cross-section of a pocket unit (137) and an OIS rail (117).

The OIS rail (117) may be arranged with two wall surfaces slanted to an optical axis direction to allow being point-contacted to the OIS ball (20). For example, a cross-section of the OIS rail (117) may be formed with a 'V'-shaped groove.

The OIS rail (117) may be point-contacted at two points to the OIS ball (20) regardless of the position of the OIS ball (20).

Figure 2:
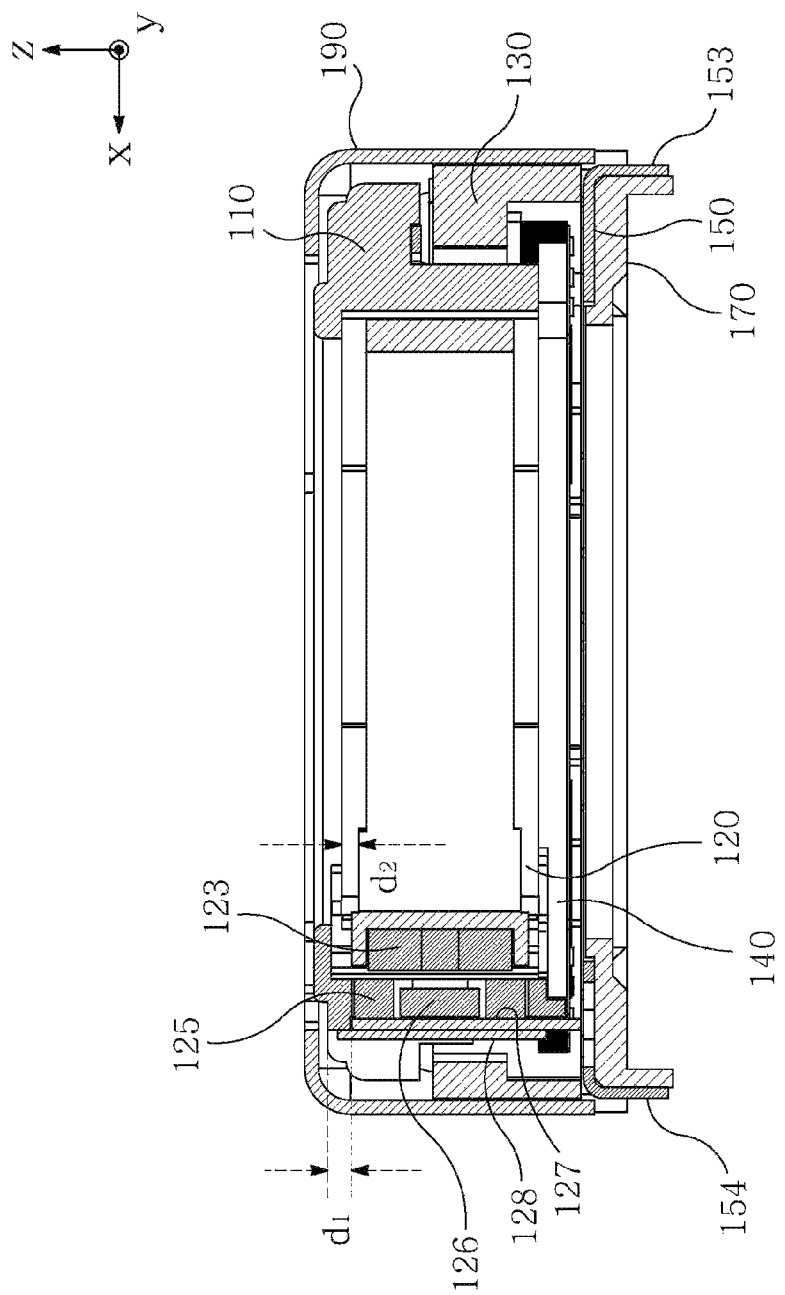
FIG. 2 is a cross-sectional view illustrating an OIS camera module according to the present invention.

Now, returning to FIG. 2, a through hole (119) facing the lens may be formed at a center of the upper unit (110) of the first unit (110, 140).

The center area of the upper unit (110) may be thinly formed in a plane view due to the through hole. Therefore, the problem is that the center area may be weak to an external force. According to the present invention, an edge area d1 of the first unit (110, 140) may be formed with a staircase d2 at a center area of the first unit (110, 140). Because of the staircase, a gap between the edge area d1 of the first unit (110, 140) and the second unit (130) may be formed greater than a gap between the center area d2 of the first unit (110, 140) and the second unit (130).

Thickness of the center area d2 may be sufficiently thickened to supplement the insufficient durability due to the staircase, and a mounting (installation) space for the OIS ball (20), the AF actuator and the OIS actuator can be sufficiently obtained by reducing the thickness of the edge area d1 where the sufficient durability is guaranteed.

The AF actuator may be provided with an AF magnet (123) and an AF coil (125). At this time, an AF substrate (127) applying an AF control signal to the AF coil (125) may be mounted on the first unit (110, 140) along with the AF actuator.

The AF substrate (127) may be electrically connected to the AF actuator, to be more specific, may be electrically connected to the AF coil (125).

The OIS camera module according to the present invention may be provided with a plurality of OIS suspensions (136) connected to the first unit (110, 140) and the second unit (130) to return the first unit (110, 140) to an initial position on the horizontal direction relative to the second unit (130).

At this time, the AF substrate (127) may be provided with a first terminal (71) mounted on a first surface of the AF substrate (127), and a second terminal (72) mounted on a second surface of the AF substrate (127).

Furthermore, the plurality of OIS suspensions (136) can guide the movement of the first unit to allow guiding the first unit to linearly move along the horizontal direction. The OIS suspensions (136) can provide linearity to the first unit to move along the horizontal direction during OIS driving.

The OIS suspensions (136) may include a leaf spring or a wire spring elastically supporting the first unit (110, 140) relative to the second unit (130), and simultaneously and electrically connecting the AF substrate (127) and the second unit (130).

The kinds of electrical signals flowing between the AF actuator and the controller are in a plural number, such that the OIS suspension (135) may be also provided in a plural number by matching thereto.

A distal end of a part of the OIS suspensions in the plurality of OIS suspensions (136) may be arranged opposite to a first surface of the AF substrate (127) and a distal end of the remaining part of the OIS suspensions may be arranged opposite to a second surface of the AF substrate (127). According to the exemplary embodiment of the present invention, the size of the AF substrate (127) can be miniaturized to increase installability of the plurality of OIS suspensions, whereby each OIS suspension can be advantageously arranged in a symmetrical manner.

For example, the AF substrate (127) may be provided with four (4) terminals. At this time, two terminals may be arranged on a first surface and the remaining two terminals may be arranged on a second surface.

The AF substrate (127) may be provided with a coil and an AF Hall sensor (126). At this time, a first (+) terminal and a first (−) terminal may be required in order to drive the coil. Furthermore, a second (+) terminal and a second (−) terminal may be required to drive the AF Hall sensor (126). In addition, in order to receive a detection signal of the AF Hall sensor (126), a first signal terminal and a second signal terminal are required. Thus, a total of six (6) terminals are required. At this time, the AF substrate (127) may suffice only with a total of four (4) terminals because the first (−) terminal, the second (−) terminal and the second signal terminal can be formed in one by signal processing of the signal processor provided at the substrate.

Figure 7:
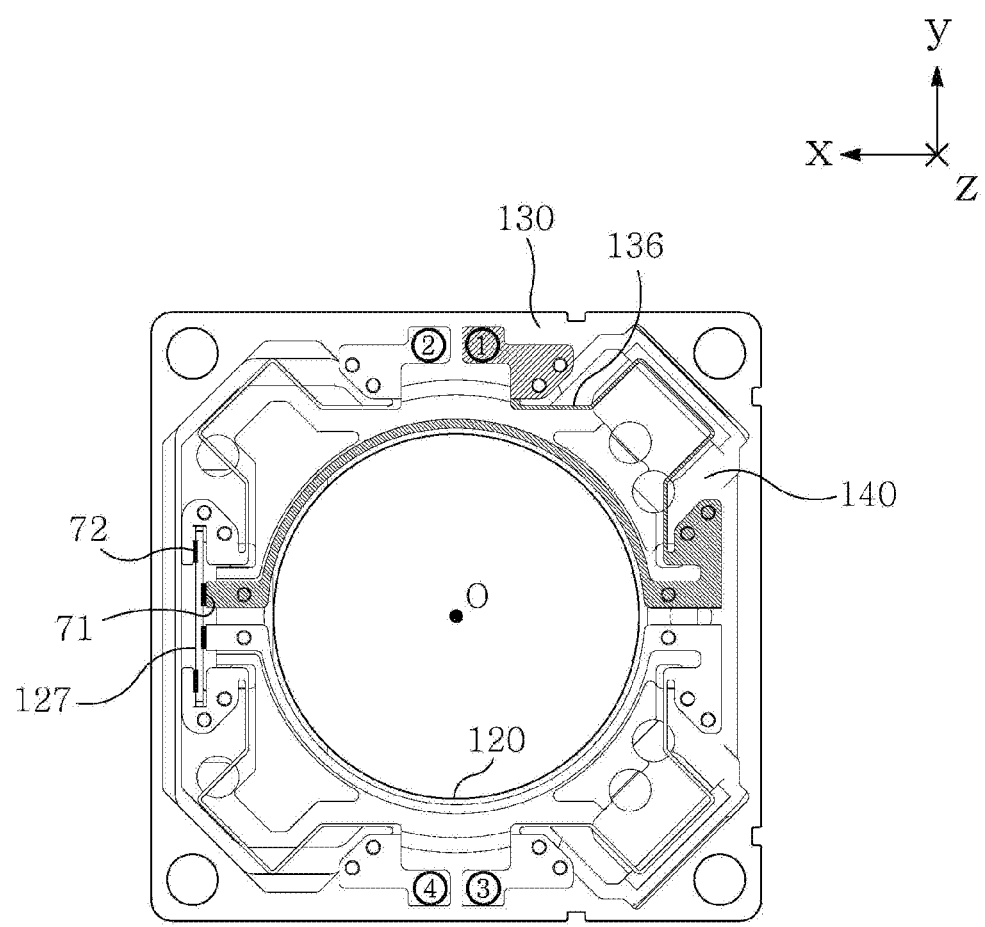
FIG. 7 is a bottom view of a second unit.

FIG. 7 illustrates a drawing in which four (4) ①, ②, ③, ④ OIS suspensions (136) are provided in order to respectively connect the four terminals provided on the AF substrate (127).

Each OIS suspension (136) can electrically connect each terminal of the second unit (130) and the AF substrate (127).

The plurality of OIS suspensions (136) may be point-symmetrical to the center 0 of the lens, or may be line-symmetrical to ⓐ axis or ⓑ axis. At this time, the moment caused by the OIS suspensions (136) can be minimized, because a starting point of a leg (extension line) of the OIS suspension (136) connected to the second unit (130) based on the ⓐ axis or the ⓑ axis and the leg are symmetrically arranged.

Figure 9:
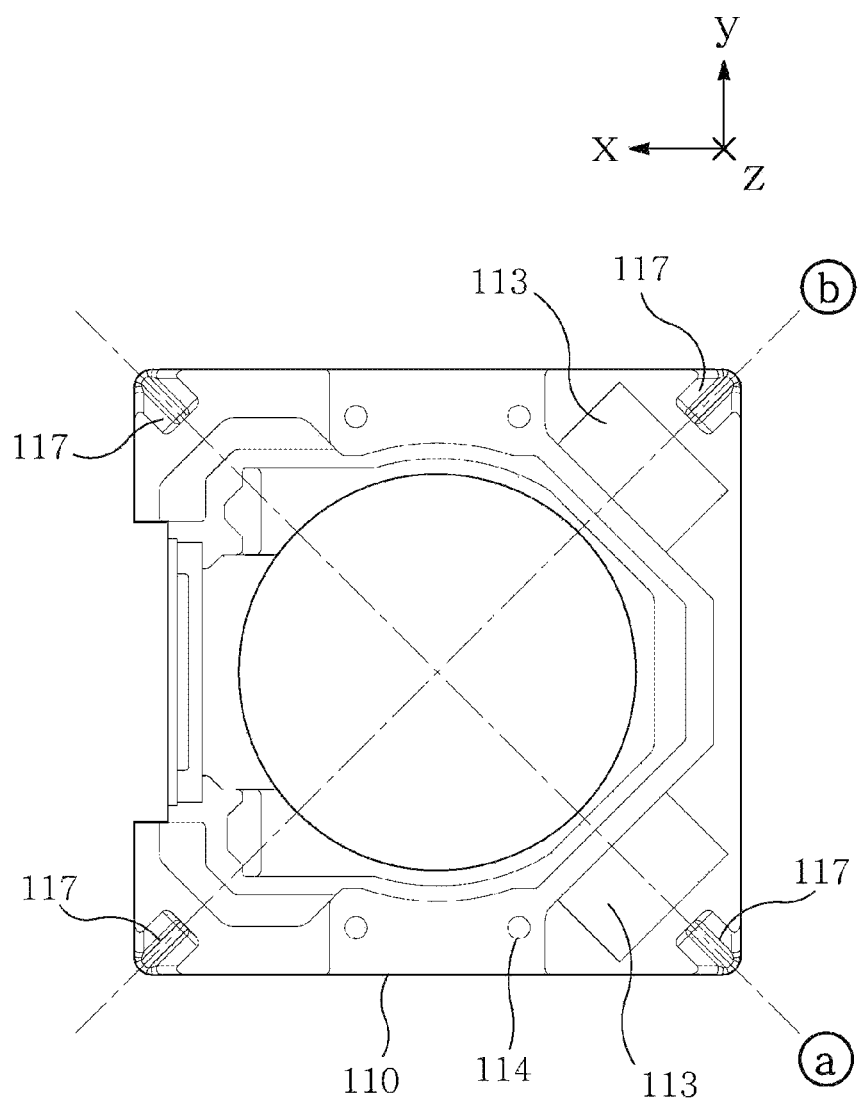
FIG. 9 is a bottom view of a first unit.

FIG. 8 is a plan view of a second unit (130), and FIG. 9 is a bottom view of a first unit (110, 140).

The first unit (110, 140), for example, the upper unit (110) or the bottom unit (140) may be formed in a rectangular shape in order to maximize a spatiality of a terminal.

The OIS actuator may generate a horizontal direction driving force moving the first unit (110, 140) along a diagonal direction ⓐ or ⓑ of the first unit (110, 140).

When the OIS ball (20) interposed between the first unit (110, 140) and the second unit (130) is provided in order to move the first unit (110, 140) along the horizontal direction, at least one of the first unit (110, 140) and the second unit (130) may be provided with an OIS rail (117) configured to guide the movement of the OIS ball (20). In the drawings, the OIS rail (117) is formed at the upper unit (110) of the first unit (110, 140).

The OIS rail (117) may be extended along the diagonal direction ⓐ or ⓑ in order to move the OIS ball (20) to move along the diagonal direction.

At least one of the first unit (110, 140) and the second unit (130) may be formed in a rectangular shape formed with in the order of the first vertex, the second vertex, the third vertex and the fourth vortex along the clockwise direction on a plane view.

The OIS actuator may be respectively formed in the vicinity of the first vortex and the second vortex. When it is assumed that a first imaginary line connecting the first vortex and the third vortex is ⓐ, and a second imaginary line connecting the second vortex and the fourth vortex is ⓑ, the first OIS actuator arranged in the vicinity of the first vortex may provide a first horizontal direction driving force moving the first unit (110, 140) along the first imaginary line ⓐ. The second OIS actuator arranged in the vicinity of the second vortex may provide a second horizontal direction driving force moving the first unit (110, 140) along the second imaginary line ⓑ.

The direction of the first horizontal direction force may be different from the first imaginary line ⓐ by an abnormal operation of the first actuator and the second actuator, or the direction of the second horizontal direction force may be changed from the second imaginary line ⓑ. When each direction of horizontal direction driving force is changed, it is impossible to implement an accurate OIS control, such that a correction means may be provided to correct directions of each horizontal direction driving force to the first imaginary line ⓐ and the second imaginary line ⓑ. At this time, the OIS rail (117) may be utilized as a correction means.

At least one of the first unit (110, 140) and the second unit (130) may be provided with a first OIS rail (117) extended alone the first imaginary line ⓐ, and a second OIS rail (117) extended along the second imaginary line ⓑ.

The OIS ball (20) may be respectively mounted on the first OIS rail (117) and the second OIS rail (117).

The direction of the first horizontal direction driving force may be restricted by the first OIS rail (117) to the first imaginary line ⓐ, and the direction of the second horizontal direction driving force may be restricted by the second OIS rail (117) to the second imaginary line ⓑ.

According to the foregoing OIS actuator and the OIS rail (117), the first unit (110, 140) can be accurately controlled in movement along the diagonal direction ⓐ or ⓑ.

When an image sensor facing the lens to obtain an image having passed the lens is provided, the image sensor may be formed with a rectangular shape having one side parallel with the first imaginary line ⓐ and the other side parallel with the second imaginary line ⓑ. Because the image sensor is arranged along a diagonal direction of the first unit (110, 140) or the second unit (130), the OIS actuator moving the first unit (110, 140) along the diagonal direction can control the first unit (110, 140) similarly to the existing x axis control and y axis control.

Meantime, in light of the fact that the image sensor is not an element mounted on the OIS camera module, the image sensor may be an element embedded in a terminal mounted with the OIS camera module. In this case, the image sensor may be mounted to a direction improving the spatiality of the terminal, and may be arranged in a shape substantially matching to the first unit (110, 140) or to the second unit (130).

At this time, in light the fact that the OIS control signal relative to the image sensor is generated based on the x axis coordinate and y axis coordinate, it is awkward for a relevant OIS control signal to be directly applied to the OIS actuator using a diagonal coordinate of x axis and y axis.

When the image sensor is extended along a first side connecting the first vortex to the second vortex, and a second side connecting the second vortex to the third vortex, the controller (not shown) controlling the OIS actuator may be inputted with an OIS control signal inclusive of a coordinate on the first side and a coordinate on the second side.

The controller may control the OIS actuator by converting the coordinate (y axis coordinate on the drawing) on the first side included in the OIS control signal and the coordinate (x axis coordinate on the drawing) on the second side to a coordinate on the first imaginary line ⓐ and a coordinate on the second imaginary line ⓑ.

According to the present invention, an AF actuator of special structure can be provided along with the OIS actuator without any particular problem due to the OIS actuator arranged at only one side based on the lens in a plane view.

Figure 3:
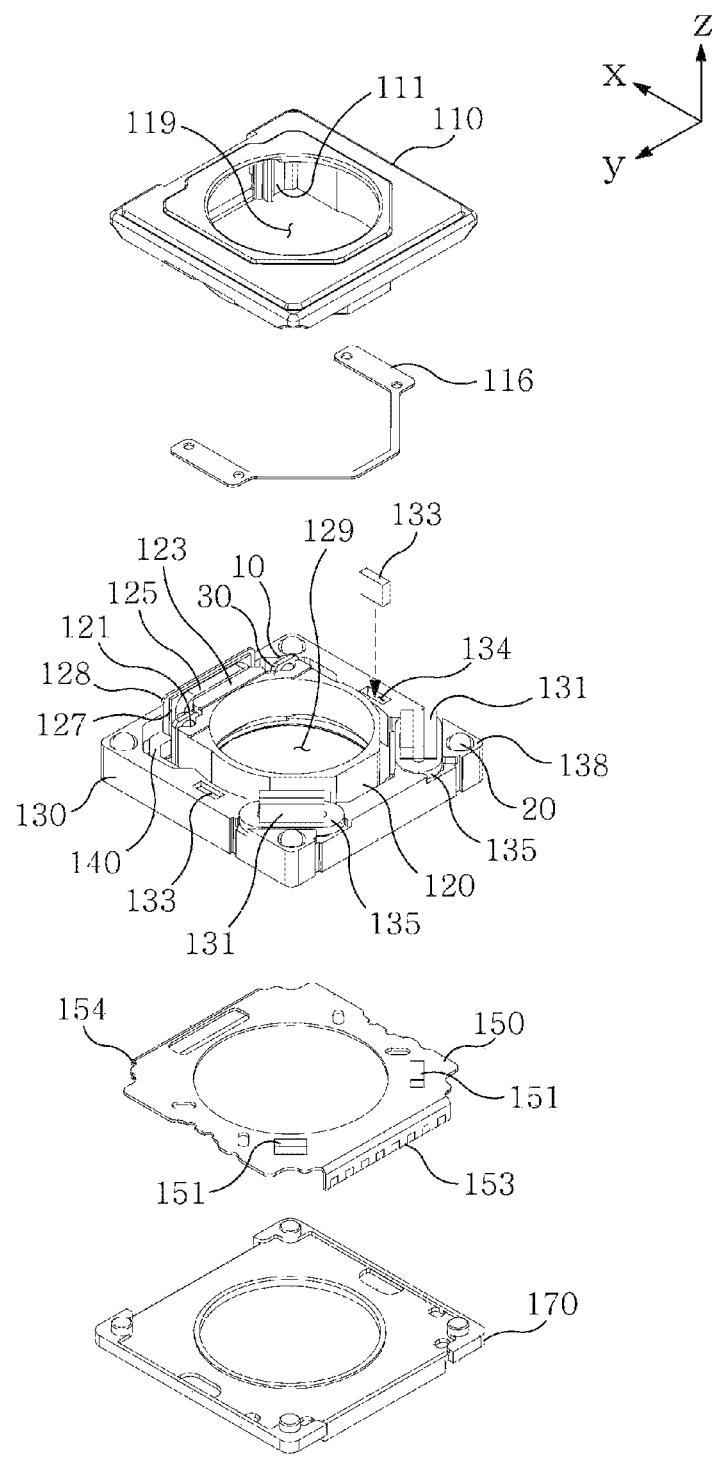
FIG. 3 is an exploded perspective view illustrating an OIS camera module according to the present invention.
Figure 4:
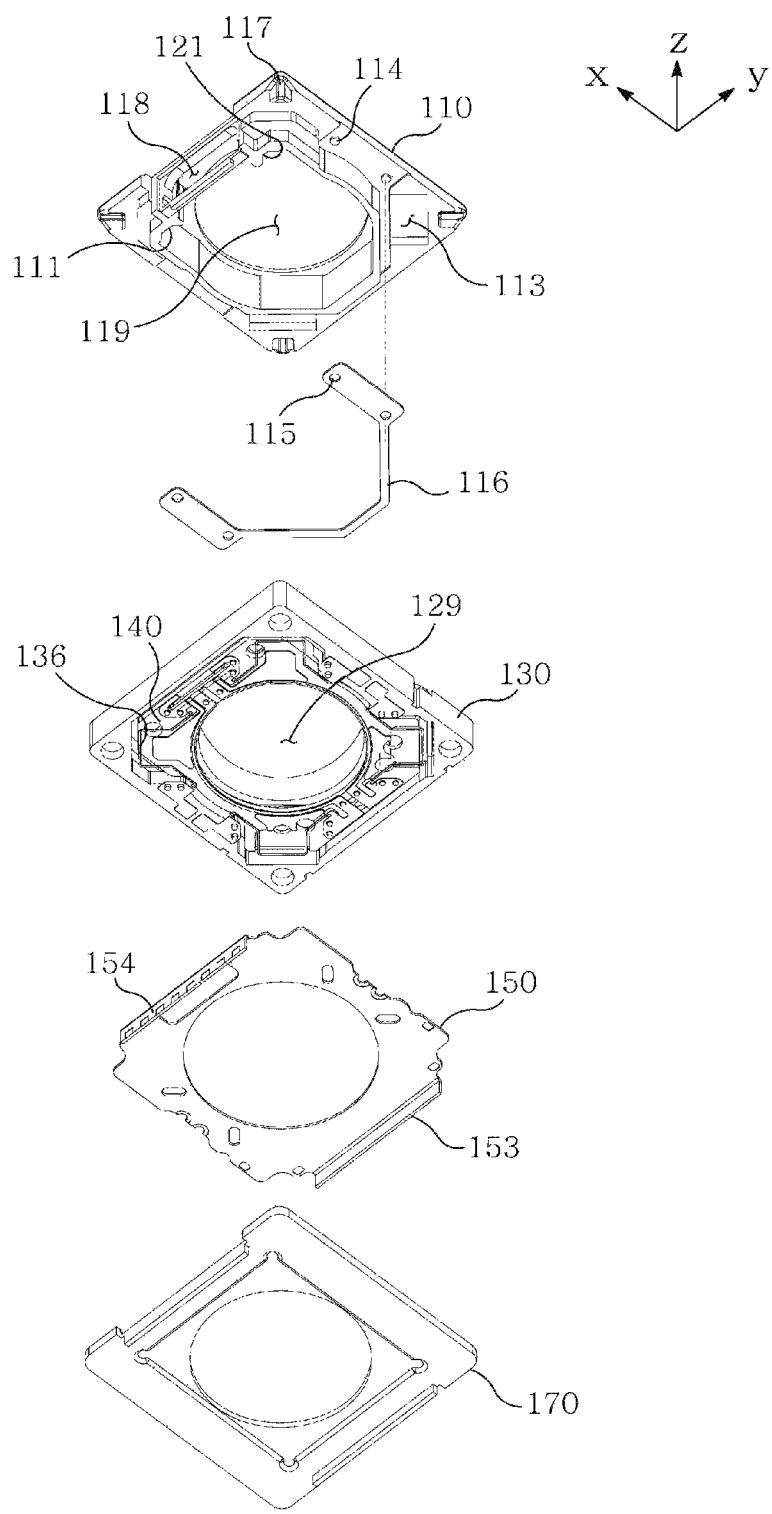
FIG. 4 is an exploded perspective view illustrating an OIS camera module viewed from underneath according to the present invention.

Referring to FIGS. 3 and 8, the OIS camera module may be provided with a first unit (110, 140) and a bobbin unit (120) movably mounted along the optical axis relative to the first unit (110, 140).

The bobbin unit (120) may be fixedly mounted with a lens (not shown). When the lens is mounted within a barrel, the bobbin unit (120) may be fixedly mounted with a barrel. Here, an optical axis is an imaginary axis on which an optical image incident on the camera module moves straight forward, and as illustrated, z axis is an optical axis.

The OIS camera module according to the present invention may include a plurality of AF balls (10) interposed between the bobbin unit (120) configured to reduce power consumed for moving the bobbin unit (120) to the optical axis and to prevent a slanted tilt and the first unit (110, 140).

A first ball alignment unit including a part of the plurality of AF balls (10) may travel linearly (straight forward) along the optical axis when the bobbin unit (120) moves to the optical axis relative to the first unit (110, 140).

A second alignment unit including the remaining part of the plurality of AF balls (10) may be arranged at the other side of the bobbin unit (120) to move linearly along the optical axis like the first ball alignment unit.

The rotatability (rotational degree of freedom) of bobbin unit (120) using the optical axis as a rotation shaft relative to the first unit (110, 140) may be restricted by the first ball alignment unit and the second ball alignment unit arranged at mutually different positons on a horizontal direction perpendicular to the optical axis.

Each ball alignment unit may be provided with a plurality of AF balls each arranged at a different position to the optical axis. According to the plurality of AF balls each arranged at a different position to the optical axis, and when an imaginary line perpendicular to the optical axis and crisscrossing the first ball alignment unit and the second ball alignment unit is assumed, the rotatability of bobbin unit (120) using the imaginary line as a rotation shaft may be restricted. Due to the foregoing explained staircases d1 and d2 by the upper unit (110) of the first unit (110, 140), a gap between each AF ball can be greatly increased along the optical axis direction, whereby the rotatability can be more securely restricted.

In order to constantly maintain a distance among the plurality of AF balls (10) arranged at each ball alignment unit, the ball alignment unit may be provided with a ball retainer (30) to constantly maintain a distance of each AF ball.

According to the method in which the AF ball (10) is arranged between the bobbin unit (120) and the first unit (110, 140), and the bobbin unit (120) and the first unit (110, 140) are relatively moved to the optical axis direction through the rolling contact of the AF ball (10), the elastic force of elastic member is not applied to free from being required of power necessary for overcoming a relevant elastic force. Thus, the power consumption can be reduced. Furthermore, the bobbin unit (120) can be moved by the same power regardless of position of the bobbin unit (120), whereby the position control of the bobbin unit (120) can be easily implemented.

However, means to restrict the degree of freedom of ball must be additionally added compared with the method using elastic member in terms of characteristics of ball having a greater degree of freedom.

The OIS camera module according to the present invention may be mounted with a distance maintenance unit (not shown) in order to address a problem in which the first ball alignment unit and the second alignment unit each arranged at a different position to the horizontal direction.

In addition, the OIS camera module according to the present invention may be provided with a suction unit sucking the bobbin unit (120) to the first unit (110, 140) along the x axis direction (first direction).

The bobbin unit (120) and the first unit (110, 140) may be mutually and tightly stuck in response to the suction force of the suction unit to thereby solve the problem of the first unit (110, 140) being distanced from the bobbin unit (120). However, the bobbin unit (120) and the first unit (110, 140) cannot be physically stuck due to the ball alignment interposed between the bobbin unit (120) and the first unit (110, 140), such that the bobbin unit (120) and the first unit (110, 140) can maintain a predetermined gap to the second direction.

A groove-shaped AF rail extended along the optical axis may be respectively formed on one surface of the bobbin unit (120) facing the first unit (110, 140) and one surface of the first unit (110, 140) facing the bobbin unit (120) in order to prevent each ball alignment unit from being deviated from the first unit (110, 140) or the bobbin unit (120) along a second direction.

In the drawings, the AF rail is shown to be formed on the upper unit (110) between the upper unit (110) and the bottom unit (140) constituting the first unit (110, 140).

A total of two rails, one rail on the first unit (110, 140) and one rail on the bobbin unit (120), may be provided in order to guide the first ball alignment unit, and a total of two rails, one rail on the second unit (130) and one rail on the bobbin unit (120), may be provided in order to guide the second ball alignment unit. Hence, on the whole, two rails may be formed on the first unit (110, 140), and two rails may be formed on the second unit (130).

In order to prevent a rotational tilt of the bobbin unit (120) at the center of the optical axis from being generated from tolerance of each rail, one of the four rails may be formed with a first rail (111) one-point supported to the AF ball (10), and remaining three rails may be formed with a second rail (121) two-point supported to the AF ball (10).

For example, the first rail (111) may be formed in a '1'-shaped cross-section, and the second rail (121) may be formed in a "V"-shaped cross-section.

The suction unit may be provided with an AF magnet (123) mounted on the bobbin unit (120), and an AF yoke (128) mounted on the first unit (110, 140) and applied with an attractive force of the AF magnet (123).

An AF substrate (127) and an AF coil (125) may be provided on a surface facing the AF magnet (123) on the AF yoke (128). The AF yoke (128) may be mounted on a yoke installation unit (118) formed at a lateral surface of the upper unit (110).

The AF coil (125) may be mounted on a surface opposite to the AF magnet (123) on the AF substrate (127). The AF coil (125) may generate a magnetic force interacting with the AF magnet (123) by an electric signal applied to the AF substrate (127), and the bobbin unit (120) may be moved to the optical axis direction by the magnetic force.

An AF Hall sensor (126) detecting a displacement of the AF magnet (123) to the optical axis direction may be provided at a center space of the AF coil (125) wound with a conductive wire in a ring shape to be electrically conducted with an AF control signal.

A center space of the AF coil (125) is an area where magnetic force generated by the AF coil (125) is offset, such that the AF Hall sensor arranged at the center space of the AF coil (125) may be applied only with the magnetic force of the AF magnet (123). The AF Hall sensor (126) may be used to detect the changes in magnetic force of the AF magnet (123), and to grasp the optical axis direction positions of the bobbin unit (120) moving along with the AF magnet (123) and the lens.

The AF yoke (128) may be means for preventing leakage of magnetic force formed at the AF coil (125) and simultaneously for supporting the AF substrate (127) and the AF coil (125). Furthermore, the AF yoke (128) may include a magnetic substance applied with an attractive force of the AF magnet (123).

The magnetic force of the AF magnet attracting the AF yoke (128) may act as a suction force to suck the bobbin unit (120) fixed by the AF magnet (123) relative to the first unit (110, 140) fixed by the AF yoke (128).

Meantime, the ball distance maintenance unit may be integrally formed at the bobbin unit (120) or the first unit (110, 140). For example, the bobbin unit (120) and the ball distance maintenance unit are integrally formed on the drawings. A wall surface connecting two AF rails in the bobbin unit (120) may be a ball distance maintenance unit.

Although the abovementioned embodiments according to the present invention have been described in detail with reference to the above specific examples, the embodiments are, however, intended to be illustrative only, and thereby do not limit the scope of protection of the present invention.

Thereby, it should be appreciated that changes, modifications and amendments to the above examples may be made without deviating from the scope of protection of the invention.

| [Description of reference numerals] | | | |
|---|---|---|---|
| 10 | ... AF ball | 20 | ... OIS ball |
| 30 | ... ball retainer | 71 | ... first terminal |
| 72 | ... second terminal | 110, 140 | ... first unit |
| 110 | ... upper unit | 111 | ... first rail |
| 113 | ... first accommodation unit | 114 | ... first mounting unit |
| 115 | ... second mounting unit | 116 | ... suction yoke |
| 117 | ... OIS rail | 118 | ... yoke installation unit |
| 119 | ... through hole | 120 | ... bobbin unit |
| 123, 125 | ... AF actuator | 123 | ... AF magnet |
| 125 | ... AF coil | 126 | ... AF Hall sensor |
| 127 | ... AF substrate | 128 | ... AF yoke |
| 129 | ... lens hole | 130 | ... second unit |
| 131, 132, 135 | ... OIS actuator | | |
| 131 | ... first magnet | 132 | ... second magnet |
| 133 | ... suction magnet | 134 | ... insertion unit |
| 135 | ... OIS coil | 136 | ... OIS suspension |
| 137 | ... pocket unit | 138 | ... wall |
| 140 | ... bottom unit | 150 | ... OIS monitoring substrate |
| 153 | ... first terminal unit | 154 | ... second terminal unit |
| 170 | ... filter mounting unit | 190 | ... cover |

The invention claimed is:

1. An OIS camera module, the OIS camera module comprising:
   a first unit;
   a bobbin unit on which a lens is mounted, the bobbin unit movably mounted with the first unit along an optical axis of the lens;
   a second unit movably mounted with the first unit along a horizontal direction perpendicular to the optical axis of the lens;
   an OIS actuator moving the first unit along the horizontal direction relative to the second unit; and
   an auto focus (AF) actuator moving the bobbin unit with the lens along the optical axis of the lens relative to the first unit;
   wherein the OIS actuator and the AF actuator are arranged opposite to each other about a center of the lens to the horizontal direction.

2. The OIS camera module of claim 1, wherein the OIS actuator and the AF actuator each oppositely disposed based on the lens are arranged within an AF moving scope movable by the lens to the horizontal direction.

3. The OIS camera module of claim 1, further comprising:
   an OIS ball interposed between the first unit and the second unit to allow the first unit to move along the horizontal direction; and
   a suction unit configured to suck the first unit to the second unit along the optical axis, wherein
   each of the first unit and the second unit takes a rectangular shape formed clockwise to the horizontal direction on a plan view in the order of a first vertex, a first side, a second vertex, a second side, a third vertex, a third side, a fourth vertex and a fourth side, the OIS actuator is arranged near to at least one of the first vertex, the first side and the second vertex, the AF actuator is arranged at a side of the third side, the OIS ball is arrange near to the first vertex, the second vertex, the third vertex and the fourth vertex, and the suction unit is arranged at sides of the second side and the fourth side.

4. The OIS camera module of claim 1, wherein the OIS actuator includes a first magnet and a second magnet fixed to the first unit and each arranged at a different position along the optical axis, and an OIS coil fixed to the second unit and interposed between the first magnet and the second magnet, wherein the first magnet and the second magnet are configured such that an N pole of the first magnet faces an S pole of the second magnet, and an S pole of the first magnet faces an N pole of the second magnet.

5. The OIS camera module of claim 4, wherein the second unit is provided with an OIS Hall sensor opposite to the second magnet to shield a magnetic force of the OIS coil transmitted to the OIS Hall sensor by the second magnet interposed between the OIS Hall sensor and the OIS coil.

6. The OIS camera module of claim 1, wherein the OIS actuator includes a first OIS member and a second OIS member each relatively moving by the magnetic force, wherein the first OIS member is arranged in plural number at a position mutually distanced along the optical axis and fixed to any one of the first and second units, the second OIS member is interposed between the plurality of first OIS members to be fixed to any one of the first and second units, any one of the first OIS member and the second OIS member includes a magnet, and the remaining other member of the first and second OIS members includes a coil.

7. The OIS camera module of claim 1, further comprising:
an OIS ball interposed between the first unit and the second unit to allow the first unit to move along the horizontal direction;
a suction unit configured to suck the first unit to the second unit along the optical axis to allow the first and second units to contact the OIS ball, wherein the suction unit includes a suction magnet mounted on any one of the first and second units, and a suction yoke sucked to the suction magnet by being mounted on the remaining other unit of the first and the second units, and wherein the suction yoke is more lengthily extended than the suction magnet to the horizontal direction.

8. The OIS camera module of claim 1, further comprising:
an OIS ball interposed between the first and second units to allow the first unit to move along the horizontal direction, wherein
any one of the first and second units is provided with a pocket unit supported at one side of the OIS ball, and the other remaining unit of the first and second units is provided with an OIS rail supported at the other side of the OIS ball, wherein
the pocket unit includes a groove blocked in four sides by a wall, the OIS rail is extended to a set direction, the OIS rail is provided with two wall surfaces slanted to the optical axis direction to allow being point-contacted to the OIS ball, and the OIS rail is two-point contacted to the OIS ball regardless of a position of the OIS ball.

9. The OIS camera module of claim 1, wherein the first unit is formed at a center with a through hole facing the lens, a staircase is formed between an edge area of the first unit and a center area of the first unit, and a gap between the edge area of the first unit and the second unit is formed greater than a gap between the center area of the first unit and the second unit due to the staircase.

10. The OIS camera module of claim 1, further comprising:

an AF substrate mounted at the first unit to be electrically connected to the AF actuator; and
a plurality of OIS suspensions connected to the first unit and the second unit to return the first unit to an initial position on the horizontal direction relative to the second unit or to guide the movement of the first unit in order to allow the first unit to linearly move along the horizontal direction, wherein
the AF substrate is provided with terminals mounted on the AF substrate, and the OIS suspensions are electrically connected to the terminals of the AF substrate respectively to transfer electrical signals between the AF actuator and a controller.

11. The OIS camera module of claim 10, wherein the plurality of OIS suspensions is symmetrically distributed around the center of the lens.

12. The OIS camera module of claim 1, wherein the first unit takes a rectangular shape, and the OIS actuator generates a horizontal direction driving force moving the first unit along a diagonal direction of the first unit.

13. The OIS camera module of claim 12, further comprising an OIS ball interposed between the first unit and the second unit to allow the first unit to move along the horizontal direction, wherein at least one of the first unit and the second unit is provided an OIS rail guiding the movement of the OIS ball, and wherein the OIS rail is extended along the diagonal direction to allow the OIS ball to move to the diagonal direction.

14. The OIS camera module of claim 1, further comprising an OIS ball interposed between the first unit and the second unit to allow the first unit to move along the horizontal direction, wherein the first unit or the second unit takes a rectangular shape formed clockwise to the horizontal direction on a plan view in the order of a first vertex, a second vertex, a third vertex and a fourth vertex, the OIS actuator is formed near to a vicinity of the first vertex and the second vertex, and wherein a first OIS actuator arranged at a vicinity of the first vertex provides a first horizontal direction driving force moving the first unit along a first imaginary line, when assuming a first imaginary line connecting the first unit and the second unit, and imagining a second imaginary line connecting the second vertex and the fourth vertex, and wherein a second OIS actuator arranged at a vicinity of the second vertex provides a second horizontal direction driving force moving the first unit along the second imaginary line.

15. The OIS camera module of claim 14, wherein at least one of the first unit and the second unit is provided with a first OIS rail extended along the first imaginary line and a second OIS rail extended along the second imaginary line, and wherein the OIS ball is mounted at the first OIS rail and the second OIS rail respectively, a direction of the first horizontal direction driving force is limited to the first imaginary line by the first OIS rail, and a direction of the second horizontal direction driving force is limited to the second imaginary line by the second OIS rail.

16. The OIS camera module of claim 14, further comprising an image sensor arranged opposite to the lens to obtain an image having passed the lens, wherein the image sensor is formed with a rectangular shape having one side parallel with the first imaginary line and the other side parallel with the second imaginary line.

17. The OIS camera module of claim 14, further comprising:
an image sensor arranged opposite to the lens to obtain an image having passed the lens, and
a controller controlling the OIS actuator, wherein the image sensor is extended along a first side connecting the first vertex and the second vertex, and along a second side connecting the second vertex and the fourth vertex, and wherein the controller is inputted with an OIS control signal included with a coordinate on the first side and a coordinate on the second side, and wherein the controller controls the OIS actuator by converting the coordinate on the first side and the coordinate on the second side included in the OIS control signal to a coordinate on the first imaginary line and a coordinate on the second imaginary line.

18. The OIS camera module of claim 14, further comprising:

an OIS ball interposed between the first unit and the second unit to allow the first unit to move along the horizontal direction, wherein, the first unit is a combination of an upper unit provided at the first axis and a bottom unit provided at the second axis, when one side of the optical axis incident on a light is defined as the first axis, and the other side of the optical axis to which the light exits to an image sensor direction is defined as the second axis, and wherein the OIS ball is interposed between the upper unit provided at the first axis and the second unit.

* * * * *